Dec. 1, 1964          E. F. BARES ETAL          3,159,142
                      ANIMAL FEEDER SYSTEM
Filed April 22, 1963                        2 Sheets-Sheet 1
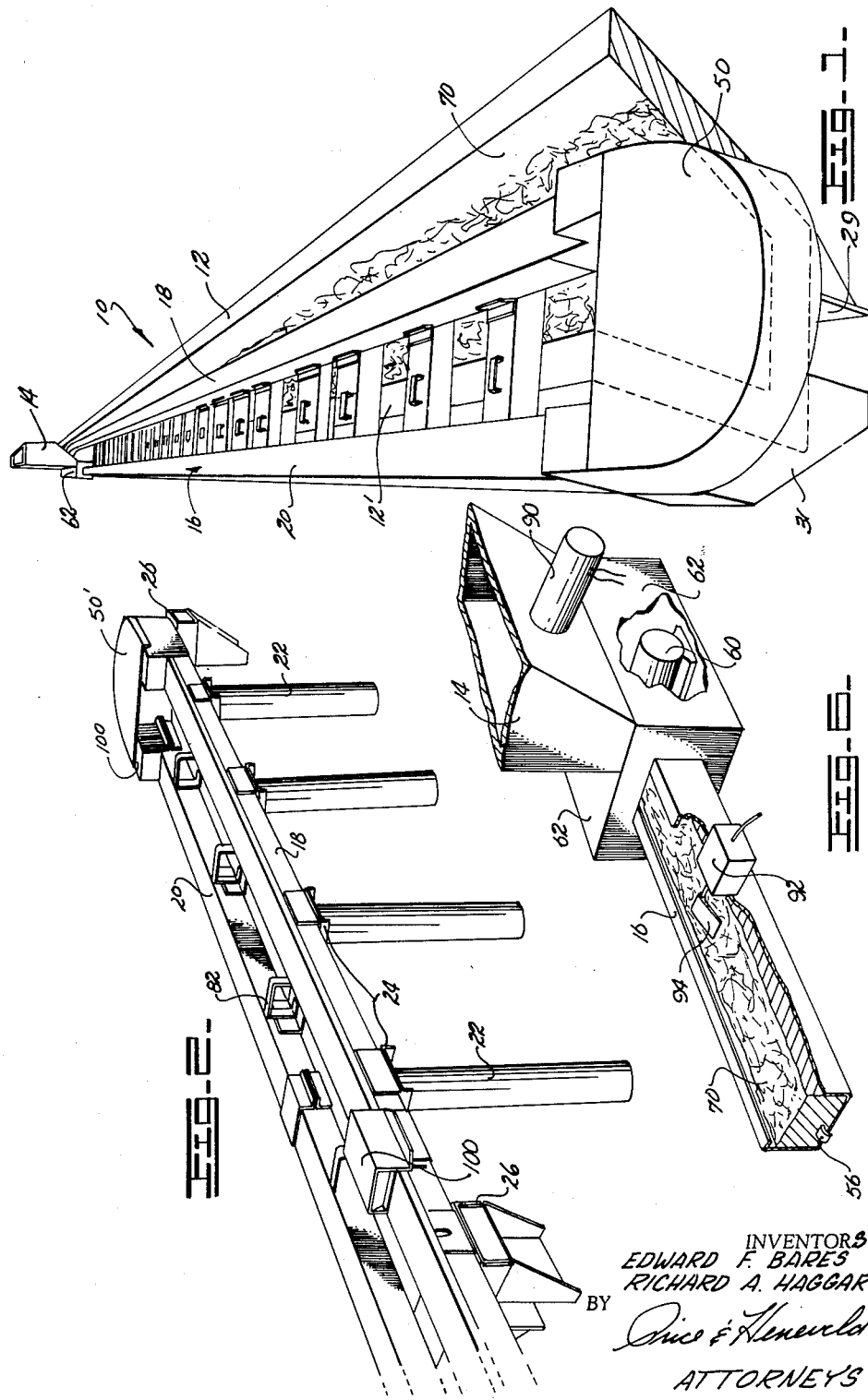
INVENTORS
EDWARD F. BARES
RICHARD A. HAGGARD
BY
*Price & Heneveld*
ATTORNEYS Dec. 1, 1964   E. F. BARES ETAL   3,159,142
ANIMAL FEEDER SYSTEM
Filed April 22, 1963   2 Sheets-Sheet 2
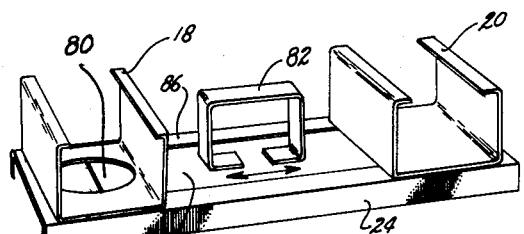
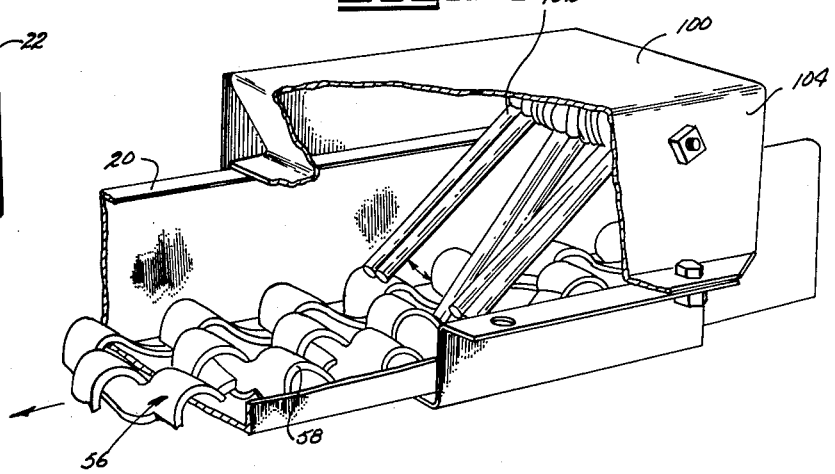
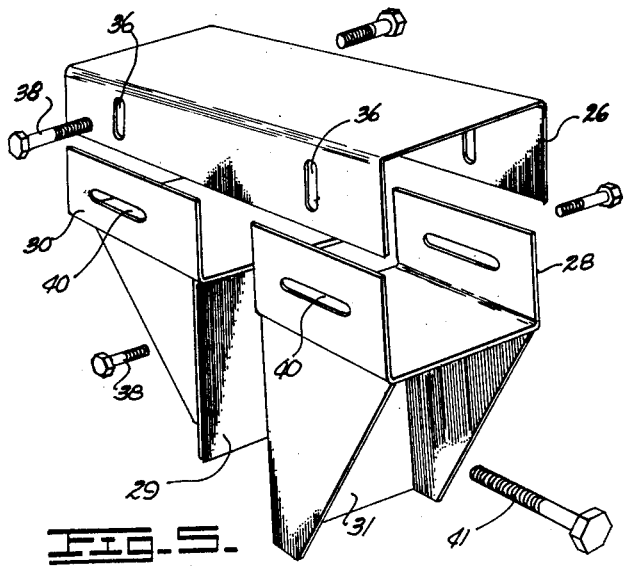
INVENTORS
EDWARD F. BARES
RICHARD A. HAGGARD
BY
ATTORNEYS

United States Patent Office 3,159,142
Patented Dec. 1, 1964

3,159,142
ANIMAL FEEDER SYSTEM
Edward F. Bares, Grand Haven, Mich., and Richard A. Haggard, Nacogdoches, Tex., assignors to Automatic Poultry Feeder Company, Zeeland, Mich., a corporation of Michigan
Filed Apr. 22, 1963, Ser. No. 274,484
7 Claims. (Cl. 119—52)

This invention relates to an automatic cattle feeding system, and more particularly to cattle feeding apparatus attachable to a conventional, elongated, cattle manger, and allowing automatic regulated feeding.

The process of raising cattle for beef requires constant feeding to all of the cattle in regulated amounts. Conventionally this is largely done by manual labor, requiring considerable time. The feed is usually distributed in a long manger, enabling dozens and even hundreds of beef cattle to feed simultaneously.

One important reason why cattle feed has not been handled automatically heretofore involves the fact that to obtain maximum weight increase per head for the amount of feed, a sweetener such as molasses or its equivalent is ordinarily mixed with cattle feed. Although this is very effective for increasing weight gain, heretofore the moist sticky characteristic of the mixture has been one significant factor preventing effective dependable automatic handling of the feed with conveying equipment. The feed tends to cake and pack in the hopper. It also cakes within and around the links of the conveyor chain.

Another significant reason for the failure of raisers of feed cattle to adopt automatic feeding methods heretofore, was the lack of a system adaptable to existing mangers.

It is, therefore, an object of this invention to provide a cattle feeding system that effectuates dependable automatic feeding of conventional feed to many cattle simultaneously, without significant manual labor or time.

It is another object of this invention to provide an automatic cattle feeder that can be mounted on a conventional elongated manger without modifying the manger, yet permitting complete cattle access to the manger as before. It needs no special supports. The apparatus is moreover attachable as a unit. It further accommodates mangers that are tilted slightly, or otherwise unlevel. It adapts moreover to mangers that are not exactly straight.

It is another object of this invention to provide an automatic cattle feeding conveyor apparatus that is enclosed and dispenses regulated amounts of feed to all portions of the manger in accordance with desired distribution. Individual feed outlets for various portions of the manger can be manually pre-set quickly and easily, so that the feed is gravity fed from the trough of the mechanism into the manger.

It is still another object of this invention to provide a cattle feeder system capable of efficient and effective handling and distribution of moist cattle feed containing a sweetener such as molasses, even using gravity methods, without hanging up of the feed in the hopper or packing of the feed in the conveyor chain.

Briefly, therefore, the novel automatic system for feeding cattle is readily attachable to an elongated conventional manger even if crooked or tilted, enables feeding without caking of feed, eliminates the major amount of hand labor, operates efficiently and effectively, and allows regulation of feed flow to each section of the manger.

These and several other objects of this invention will be apparent upon studying the following specification in conjunction with the drawings in which:

FIG. 1 is a perspective view of the cattle feeding system with the conveyor mechanism mounted on one edge of a manger;

FIG. 2 is a perspective fragmentary view of a portion of the apparatus in FIG. 1 showing the delivery conveyor branch with downspouts and end turn-around, and the return conveyor branch;

FIG. 3 is a fragmentary perspective view of one downspout and regulating gate therefor;

FIG. 4 is a fragmentary, perspective cut-away view of a novel striking means to prevent caking of feed in the chain;

FIG. 5 is a perspective partially exploded view of one of several pairs of mounting bracket legs for attachment of the trough to the manger; and FIG. 6 is a fragmentary perspective cut-away view showing apparatus for preventing caking of feed in the hopper.

Basically, the cattle feeding apparatus comprises a delivery trough and a return conveyor trough mounted parallel and adjacent to each other on transverse supports that also support and guide variable gating panels to spaced down-spouts that extend into the manger. Horizontally and vertically adjustable bracket legs straddle an edge of a manger to support the trough. Hopper means is operably associated with the trough and includes vibratory means actuated by feed level in the trough to prevent hang-up of feed in the hopper. An endless conveyor chain is in the trough. Biased striking means repeatedly raps the chain to loosen packed feed from the chain scoops, and thereby assure gravity feed out of the chain into the downspouts.

Referring now specifically to the drawings, the cattle feeding system 10 includes manger 12, hopper 14, conveyor trough means 16 including delivery trough 18 and return trough 20, and a plurality of downspouts 22 on the delivery trough extending downwardly into manger 12.

The manger 12 may be a conventional, generally U-shaped, elongated manger capable of supplying feed to a large number of cattle simultaneously. The conveyor system and specifically its trough means 16, is supported on a series of adjacent parallel supports 24 and 26 (FIG. 2) which extend transversely beneath both the delivery trough and the return trough, and are secured to the troughs by suitable means such as bolts, weldments or the like.

The larger supports 26 are generally U-shaped and inverted. Each receives a correspondingly U-shaped but upright pair of brackets 28 and 30 that include depending legs 29 and 31 straddling edge 12' of manger 12. Each pair of brackets 28 and 30 is vertically adjustable with respect to its support 26, by using vertically elongated connecting slots 36 in support 26. Upon loosening bolts 38, bracket legs 28 and 30 can be vertically moved with respect to the trough means. This vertical adjustment shifts the lower edges of support 26 vertically to place the central portion thereof into contact with the manger edge, and thus enables the trough means to be adjusted to a level condition, regardless of any slope, slant, or other irreguluar vertical dimension of the manger.

Similarly, the pair of brackets may be horizontally adjusted with respect to the feed trough because of horizontally elongated slots 40 in the brackets adjacent the vertical slots 36. Upon loosening bolts 38, the legs of the brackets may be horizontally adjusted either together or independently, to enable the trough to accommodate even irregularly shaped mangers, and also to enable the legs to be pressed tightly against both sides of edge 12 of the manger to grip it. The complete assembly is therefore mounted on the edge of the manger by straddling the brackets over the edge, adjusting them vertically and horizontally, and then tightening them against the edge. If desired, a bolt 41 may be extended through the wall of the manger between the legs 29 and 31 of the brackets 28 and 30 for more secure attachment.

The ends of the parallel delivery and return conveyors are operably connected by turn-arounds 50 and 50' of a conventional type. Each includes an idler sprocket to guide the feed chain around the 180° turn. Operably associated with and above the trough means is a feed hopper 14 of desired construction, to allow feed to flow by gravity into the trough to be conveyed by the chain. The chain 56 comprises a plurality of interconnected links which form an articulated endless conveyor. The links include scoops 58 that push the feed along through the trough as the chain is driven by a conventional motor and sprocket 60 through the housing 62 beneath the hopper.

The chain pushes the feed to a series of spaced downspouts 22 along the manger. Each has an upper inlet orifice formed in the bottom of the delivery trough 18 so that feed 70 conveyed through the trough falls by gravity through the orifices and downspouts and into manger 12.

To provide regulation of the amount of feed to each downspout, and thus to each section of the manger, gating means in the form of a sliding panel 80, with an external handle 82 between the two conveyor troughs 18 and 20, is provided over each orifice leading to the downspout (FIG. 3). Sliding movement of the panel by the handle causes the panel to cover the outlet orifice varying amounts to regulate the amount of feed through each downspout. The conveyor chain travels over the several panels. The panel is guided in its sliding movement by flanges 86 on the upper portion of support 24. The plurality of gating valves provide exact control in a predetermined manner over the feed flowing to each section of the manger.

Since the cattle feed is moist due to its molasses content, the feed tends to cake and pack in feeding hopper 14, especially in the convergent lower portions thereof. To prevent excessive caking, a regulating mechanism is utilized. Referring to FIG. 6, a vibratory motor 90 of conventional type is mounted to the wall of hopper 14. This motor is electrically connected to a suitable electrical output (not shown) and in series with a micro switch 92. Actuation of micro switch 92 is controlled by a depending pivotal paddle or arm 94 extending into trough 16 and pivoted varying amounts by the level of feed 70 passing therethrough. Thus, if the feed level becomes low in the trough due to the fact that the feed is caked in the hopper and is not being discharged, the paddle will swivel downwardly by gravity and will actuate switch 92. The switch completes the electrical circuit to vibratory motor 90, causing it to operate to loosen the feed in the hopper. The feed shakes down into the conveyor until the feed level rises to a sufficient amount to pivot arm 94 upwardly sufficiently to deactivate the micro switch 92. The vibrator then stops until needed again. The mechanism therefore controls the feed to prevent this caking problem, and renders the mechanism reliable even though used with sticky moist feeds.

Another tendency of this moist feed is to pack and cake within and around scoops 58 of the articulated conveyor chain 56. Packing of the feed around any section of the chain prevents the feed from passing through and out of the chain and through the downspout by gravity. This caking is prevented by a series of unique striking or rapping mechanisms 100 (FIG. 4) and mounted at spaced intervals along the conveyor (FIG. 2). Each includes a plurality of rods 102 having their upper ends bent into loops. The loops are pivotally mounted on an axis as on a bolt 104 extending transversely across the mechanism housing and the trough. These rods are biased into contact with the links of the chain, preferably by their weight. Alternatively, they may be spring-biased. Consequently, as the convex upper surfaces of the spaced scoops of the chain links pass the rods, the rods are raised up and then dropped to strike the scoops and thereby loosen and knock out any feed caked thereunder. This constant sharp rapping of the chain at intervals thereby eliminates the caking problem.

In use, therefore, the mechanism is quickly and easily attached to one edge of a conventional manger and leveled to optimum operating position merely by the adjustment of bolts 38. The driving motor 60 for the chain may be activated by a timer (not shown) to periodically deliver feed from hopper 14 through delivery trough 18 and to the downspouts 22. The anti-clogging mechanism assures effective operation even when unattended.

It is realized that various obvious minor structural modifications may be made to the particular form of the invention without departing from the principles taught, to accommodate various types of mangers or environments. These obvious modifications are therefore deemed to be part of this invention, which is to be limited only by the scope of the appended claims, and the reasonably equivalent structures to those defined therein.

We claim:

1. An automatic cattle feeding apparatus comprising: an elongated manger; an elongated conveyor trough means having a delivery trough adjacent and generally above one edge of said manger, having a U-shaped return and a return trough adjacent and parallel to said delivery trough; a plurality of spaced transverse beam supports underlying and supporting both said delivery trough and said return trough; a plurality of pairs of spaced bracket legs, each pair spaced on a respective beam support and projecting downwardly and straddling said edge of said manger and mounted to said beam supports under said conveyor trough means to support said conveyor trough means on said manger while allowing cattle to feed from said manger; an endless conveyor in said trough means to deliver feed therethrough; a feed hopper operably associated with said trough means and conveyor; and feed outlet orifice means along said delivery trough above said manger to allow feed delivery to said manger along the length thereof.

2. The apparatus in claim 1 wherein each pair of brackets is horizontally adjustable with respect to said trough means to cause the trough means to follow the edge of the manger and is vertically adjustable with respect to said trough means to level the trough means on the edge of the manger.

3. A cattle feeding apparatus comprising: a feed hopper; a circuitous conveyor trough means operably associated with said hopper and including two main parallel portions forming a delivery trough and a return trough; an endless feed conveyor in said trough; a plurality of mounting brackets attached to and depending beneath said trough and having spaced, straddling legs to fit over an edge of a cattle manger and shiftable toward each other to clamp on said edge; a plurality of spaced downspouts mounted to the bottom of said trough and adapted to project into the manger; sliding gate means on the top of each of said spouts for regulation of feed flow to spaced portions of the manger, and transverse gate support and guide means between said trough and shiftably interfitted with said gate means.

4. The apparatus in claim 3 wherein said conveyor is an articulated chain of interconnected scoop-shaped links and wherein elongated striking means is pivotally mounted on one end above said links and biased into contact at the opposite end of said striking means with the passing links to repeatedly strike the links and loosen any packed feed therein, causing it to fall through the downspouts.

5. A cattle feeding apparatus comprising: a pair of parallel troughs forming a delivery trough and a return trough; U-shaped return means connecting ends of said troughs; a plurality of spaced support beams positioned transversely with respect to said troughs and mounted underneath them to integrate them into a unit; a plurality of downspouts beneath said delivery trough in line with said support beams; a slidable gating panel for each downspout, each supported and guided by one of said beams, and slidable within said trough to variably cover a respective downspout; handle means on each panel outside said troughs for external control of each gating panel; an endless conveyor in said troughs and above said panels in said delivery trough to deliver feed to said downspouts; and a plurality of downwardly depending adjustable gripping bracket legs beneath said troughs to mount said troughs to one edge of a cattle manger so that said downspouts extend into the manger.

6. A feed conveyor apparatus comprising a conveyor trough having a plurality of lower outlet orifices; an endless chain-type conveyor in said trough; said conveyor being formed of a plurality of interconnected chain links having adjacent upwardly curved, downwardly open scoops for pushing feed along the trough; and elongated link rapping means pivotally mounted on one end of said trough above said links and biased downwardly into engagement with said scoops to be lifted by each scoop and dropped back down behind it to rap each link as it passes and loosen any packed feed therein, causing it to fall out of said orifices.

7. The apparatus in claim 6 wherein said rapping means comprises a plurality of diagonally oriented rods each mounted on a pivotal axis above said conveyor and biased by gravity into contact with said links.

References Cited in the file of this patent

UNITED STATES PATENTS

| | | |
|---|---|---|
| 2,563,321 | Dugan | Aug. 7, 1951 |
| 2,914,023 | Pierre | Nov. 24, 1959 |
| 2,926,629 | Hazen | Mar. 1, 1960 |
| 2,953,282 | Peterson | Sept. 20, 1960 |